United States Patent
Voor et al.

(10) Patent No.: US 10,140,221 B2
(45) Date of Patent: Nov. 27, 2018

(54) METHOD TO HANDLE HOST, DEVICE, AND LINK'S LATENCY TOLERANT REQUIREMENTS OVER USB TYPE-C POWER DELIVERY USING VENDOR DEFINED MESSAGING FOR ALL ALTERNATE MODES

(71) Applicant: Dell Products L.P., Round Rock, TX (US)

(72) Inventors: Thomas E. Voor, Cedar Park, TX (US); Marcin M. Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 264 days.

(21) Appl. No.: 15/163,888

(22) Filed: May 25, 2016

(65) Prior Publication Data

US 2017/0344498 A1    Nov. 30, 2017

(51) Int. Cl.
*G06F 3/06* (2006.01)
*G06F 13/16* (2006.01)
*G06F 13/38* (2006.01)

(52) U.S. Cl.
CPC ............ *G06F 13/161* (2013.01); *G06F 3/065* (2013.01); *G06F 3/067* (2013.01); *G06F 3/0611* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 2009/0327774 A1* | 12/2009 | Jeyaseelan | ............ | G06F 1/3203 713/320 |
| 2013/0343250 A1* | 12/2013 | Homchaudhuri | ............ | H04W 52/0251 370/311 |
| 2014/0082242 A1* | 3/2014 | Murphy | ............ | G06F 13/24 710/263 |
| 2014/0189391 A1* | 7/2014 | Jeyaseelan | ............ | G06F 1/3206 713/320 |
| 2014/0372777 A1* | 12/2014 | Reller | ............ | G06F 1/3253 713/320 |
| 2016/0124741 A1* | 5/2016 | Hu | ............ | G06F 8/65 717/171 |

\* cited by examiner

*Primary Examiner* — Ilwoo Park
*Assistant Examiner* — Aurangzeb Hassan
(74) *Attorney, Agent, or Firm* — Terrile, Cannatti, Chambers & Holland, LLP; Stephen A. Terrile

(57) ABSTRACT

A system and method for performing a latency tolerance operation, comprising: determining whether a host and a device coupled to a cable are both capable of communicating information regarding latency tolerance; identifying a host latency tolerance and a device latency tolerance; configuring the host and the device to communicate based upon the host latency tolerance and the device latency tolerance; and, communicating between the host and the device, the communicating conforming to the host latency tolerance and the device latency tolerance.

8 Claims, 3 Drawing Sheets

METHOD TO HANDLE HOST, DEVICE, AND LINK'S LATENCY TOLERANT REQUIREMENTS OVER USB TYPE-C POWER DELIVERY USING VENDOR DEFINED MESSAGING FOR ALL ALTERNATE MODES

BACKGROUND OF THE INVENTION

Field of the Invention

The present invention relates to information handling systems. More specifically, embodiments of the invention relate to using vendor defined messaging for handling latency tolerant requirements for alternate modes of communication.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to communicate among components of information handling systems via a serial bus. For example, serial buses which conform to various universal serial bus (USB) specifications are known. An example of the USB specification is the USB 3.1 specification (often referred to as USB Type-C such as that defined by the USB Type-C Specification v1.1).

It is known for an end device to inform a host of latency tolerance requirements via latency tolerance messages via an in band signal. For example, Peripheral Component Interconnect Express (PCIe) type devices use a Latency Tolerance Requirement (LTR) latency message and USB type devices use a Latency Tolerance Message (LTM) latency message. However, with such in band signals it can be difficult to robustly affect the latency or power management states in between devices that are daisy chained together, are hot pluggable or that use alternate modes of operation. Additionally, certain types of alternate mode devices may not support the latency tolerance messages. For example, USB 2.0 and older type devices may not support latency tolerance messages, audio devices using alternate operational modes, camera flash or strobe light type devices, and DisplayPort type devices communicating using USB2.0 may not support latency tolerance messages. Furthermore, latency tolerance support in devices may be disabled when the device or host enters a sleep mode of operation and can remain disabled when the device awakens.

SUMMARY OF THE INVENTION

A system and method are disclosed for performing a latency tolerance operation. In certain embodiments, the latency tolerance operation uses vendor defined messaging for handling latency tolerant requirements for alternate modes of communication.

In certain embodiments, the latency tolerance operation defines a latency tolerance storage location in a port controller of a device. The latency tolerance storage location stores a maximum latency tolerance value for the device as well as a lowest latency tolerance value from an attached device in the chain of connections. In certain embodiments, the maximum latency tolerance value and the lowest latency tolerance value are stored within respective registers in the port controller. In certain embodiments, the port controller comprises a USB Type-C port controller. In certain embodiments, the port controller of a Type-C alternate mode device is designed with the correct latency tolerance value stored in its first register that is needed for the device to function properly. The value in the device register could be passed from downstream devices to each Type-C port in a chain of connections back to the host. In various embodiments, the value is entered by the USB Type-C port controller of the device, by a local embedded controller that recognizes the type of device, or when an alternate mode is requested by a newly connected device. The device sends this latency requirement to an upstream host, which then configures what is the best for the system overall based on an overall latency policy or user input. In certain embodiments, when the need for low latency is over, the host changes the latency setting to a higher latency setting thus reducing power draw. In certain embodiments, each link in the chain of connections (i.e., each connected device) adjusts its power management to provide the required latency of the lowest latency tolerant device, especially, the host. In certain embodiments, the port controller in the host forwards the latency tolerance requirements to the host over a general control connection. In certain embodiments, the general control connection includes one or more of an inter-integrated circuit ($I^2C$) connection, a platform controller hub (PCH) connection or an embedded controller connection.

In certain embodiments, the latency tolerance operation includes sending and sharing device latency requirements via a side band signal that does not rely upon a specification defined latency message (e.g. a LTR latency message or a LTM latency message). In certain embodiments, the device latency requirements are provided via a vendor defined message (VDM) which is transmitted via an out-of-band band signal path. In certain embodiments, the side band signal path includes a configuration channel (CC) signal path.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of this disclosure include a recognition that with certain communication protocols such as USB Type-C communication protocols, USB Latency Tolerant Messages (LTM) are not sufficient because there is a possibility for different translation interposers on the path without support for tunneling LTM so the latency information may be lost. Aspect of the disclosure include an appreciation that while certain communication protocols just do not control translation devices as long as there is valid USB Type-C connection, an environment for performing latency tolerance operations can include side-band CC signal paths to allow for extra signaling. For the purposes of this disclosure latency tolerance may be defined as an amount of latency (i.e., an amount of time information takes to traverse a system from a host to a device or vice versa) that does not adversely affect the performance of the environment in which the host and device reside. Aspects of this disclosure include an appreciation that devices communicating to meet lower latency requirements use more power than the same devices communicating to meet higher latency requirements. More specifically, low latency requirements can prevent a system from entering certain lower power states as waking up from those lower power states can require time such that the system can't meet a negotiated latency to correctly (i.e., timely) service a connected device. Aspects of the disclosure include an appreciation that often an initial value reported by an LTR and/or LTM message is very relaxed which may lead to incorrect or undesirable behavior within the environment.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
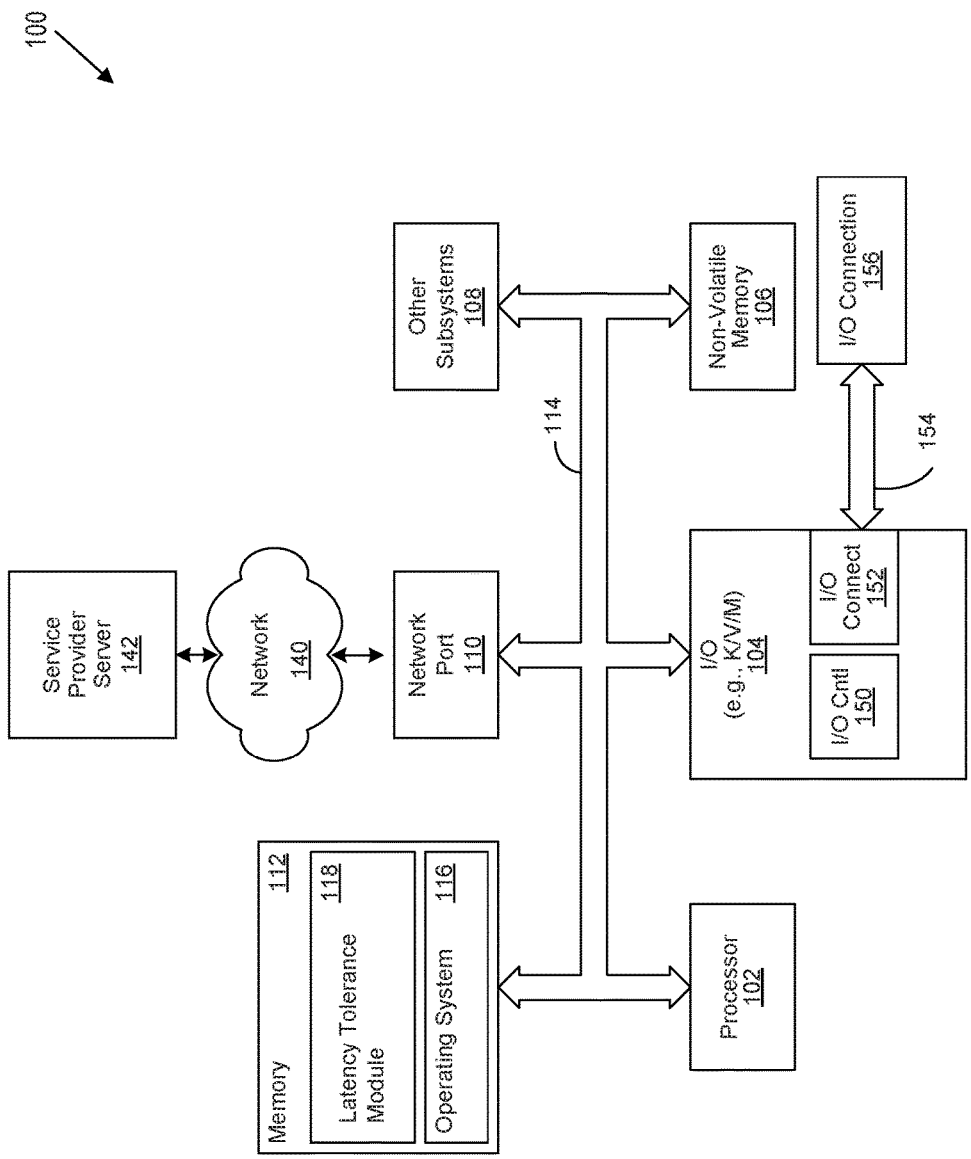
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a latency tolerance module 118.

Additionally, in various embodiments, I/O devices 104 of the information handling system 100 comprise an integrated I/O controller 150 as well as an integrated I/O connector 152. In certain embodiments, the integrated I/O controller 150 comprises a Thunderbolt 3 type integrated I/O controller. In certain embodiments, the integrated I/O connector comprises a USB Type-C connector. A multi-modal cable 154 may be coupled to the connector 152. Additionally, in certain embodiments the multi-modal cable 154 may be coupled with an I/O connection device 156 such as a docking station.

In certain embodiments, the latency tolerance module 118 enables the information handling system to perform a latency tolerance operation. In certain embodiments, the latency tolerance operation uses vendor defined messaging for handling latency tolerant requirements for alternate modes of communication. In certain embodiments, the latency tolerance operation provides an enhanced means of communicating tolerance of connected devices for system latency such as system exit latency. In certain embodiments, system exit latency refers to a C-states exit latency which determines a lowest possible power state for a processor to still wake-up on time to ensure robust service of the attached device. In certain embodiments. C-states are defined in an advanced configuration and power interface (ACPI) specification). While LTR type communications are defined for PCIe devices and LTM type communications are defined for USB3.0, not all devices support such latency tolerance communications. This can be especially common for USB 3.0 type devices as well as most if not all USB 2.0 type devices. In certain embodiments, the latency tolerance operation declares a dummy latency value to the operating system to force behavior meeting connected device specifics.

Figure 2:
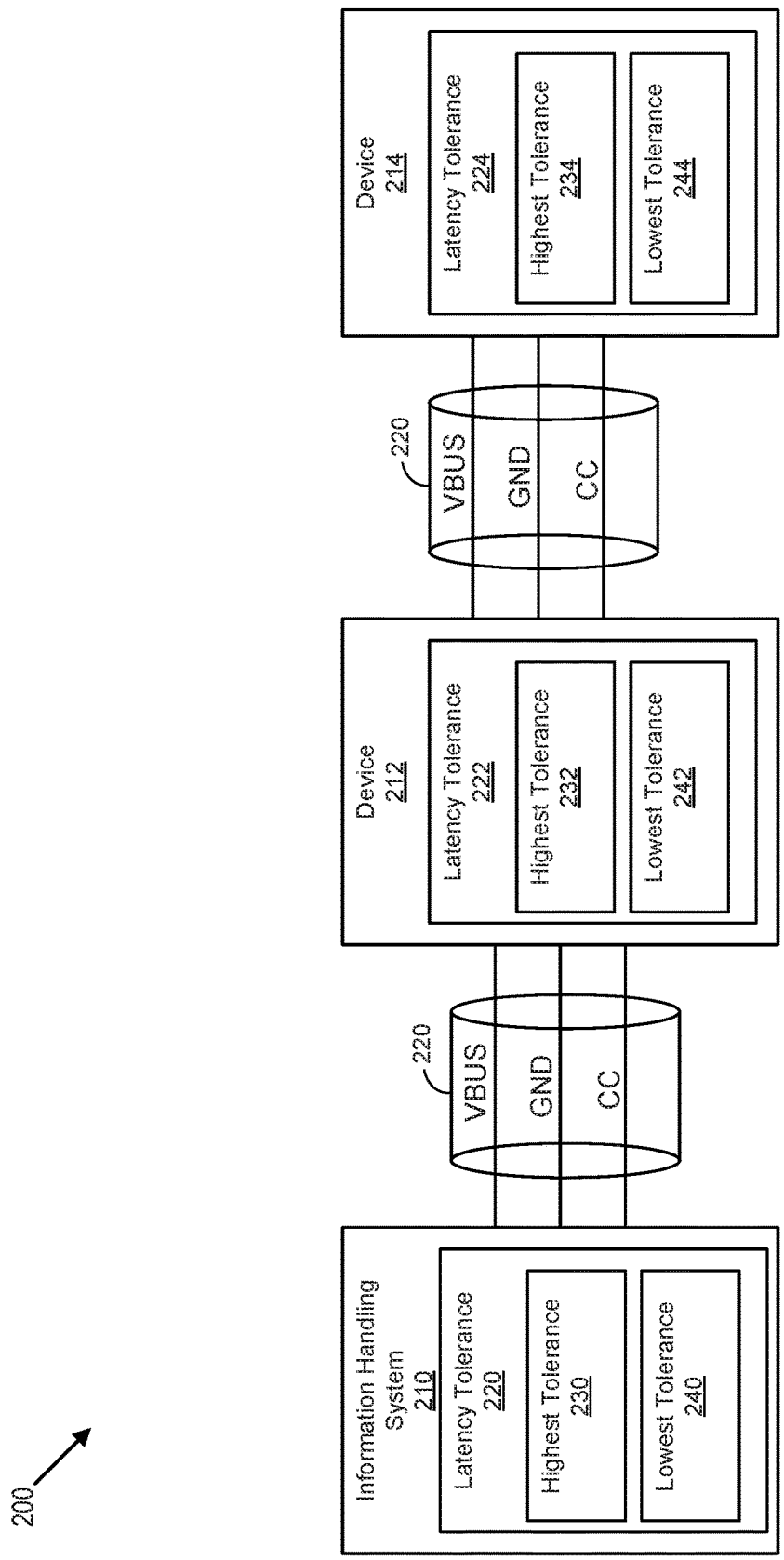
FIG. 2 shows a block diagram of an environment for performing latency tolerance operations.

FIG. 2 is a block diagram of an environment 200 for performing a latency tolerance operation. More specifically, the environment 200 includes an information handling system 210 (which may include some or all of the elements of information handling system 100) as well as a plurality of devices 214, 214 coupled in a daisy chain manner with the information handling system 210. It will be appreciated that more or fewer devices are contemplated by the disclosure.

The environment 200 also includes a multi-modal cable 220 (which may include some or all of the elements of multi-modal cable 154) coupled between the information handling system 210 and the device 212 as well as between the device 212 and the device 214. In certain embodiments the multi-modal cable 220 conforms to some or all of the portions of a USB Type-C cable. The multi-modal cable 220 includes a power signal path (VBUS), a ground signal path (GND) and a configuration channel signal path (CC).

In certain embodiments the information handling system 210 and the devices 212, 214 each include respective port controllers 220, 222, 224. In certain embodiments, some or all of the port controllers 220, 222, 224 include a respective latency tolerance storage location 230, 232, 234. In certain embodiments some or all of the latency tolerance storage locations 230, 232, 234 include a maximum latency tolerance storage location 240, 242, 244. In certain embodiments, some or all of the latency storage locations include a lowest latency storage location 250, 252, 254.

In certain embodiments, the latency tolerance storage location stores a maximum latency tolerance value for the device as well as a lowest latency tolerance value from an attached device in the chain of connections. In certain embodiments, the maximum latency tolerance value and the lowest latency tolerance value are stored within respective registers in the port controller. In certain embodiments, the port controller comprises a USB Type-C port controller. In certain embodiments, the port controller of a Type-C alternate mode device is designed with the correct latency tolerance value stored in its first register that is needed for the device to function properly. The value in the device register could be passed from downstream devices to each Type-C port in a chain of connections back to the host. In various embodiments, the value is entered by the USB Type-C port controller of the device, by a local embedded controller that recognizes the type of device, or when an alternate mode is requested by a newly connected device. A host negotiates this latency requirement with coupled downstream devices when performing latency critical functions using those devices. In certain embodiments latency critical function can include functions such as unbuffered IO devices that have low tolerance on latency (e.g., where one of the devices includes an audio codec so that a user could hear noise in a speaker due to data gaps caused by buffer underflow). Another example of a latency critical function would be mouse and/or keyboard functions where not meeting a latency requirement would produce a result that is noticeable to a user. With this example, if system entered a very low power state, the wakeup time would increase and a user could detect a delay for cursor movement and/or key strokes. When the need for low latency is over, the host changes the latency setting to a higher latency setting thus reducing power draw. In certain embodiments, each link in the chain of connections (i.e., each connected device) adjusts its power management to provide the required latency of the lowest latency tolerant device, especially, the host. In certain embodiments, the port controller in the host forwards the latency tolerance requirements to the host over a general control connection. In certain embodiments, the general control connection includes one or more of an $I^2C$ connection, a PCH connection or an embedded controller connection.

In certain embodiments, the latency tolerance operation includes sending and sharing device latency requirements via a side band signal that does not rely upon a specification defined latency message (e.g. a LTR latency message or a LTM latency message). In certain embodiments, the device latency requirements are provided via a vendor defined message (VDM) which is transmitted via a side band signal path. In certain embodiments, the side band signal path includes a CC signal path. It will be appreciated that if the latency tolerance operation includes sending device latency requirements via a side band signal then the port controllers do not necessarily require latency tolerance storage locations.

Figure 3:
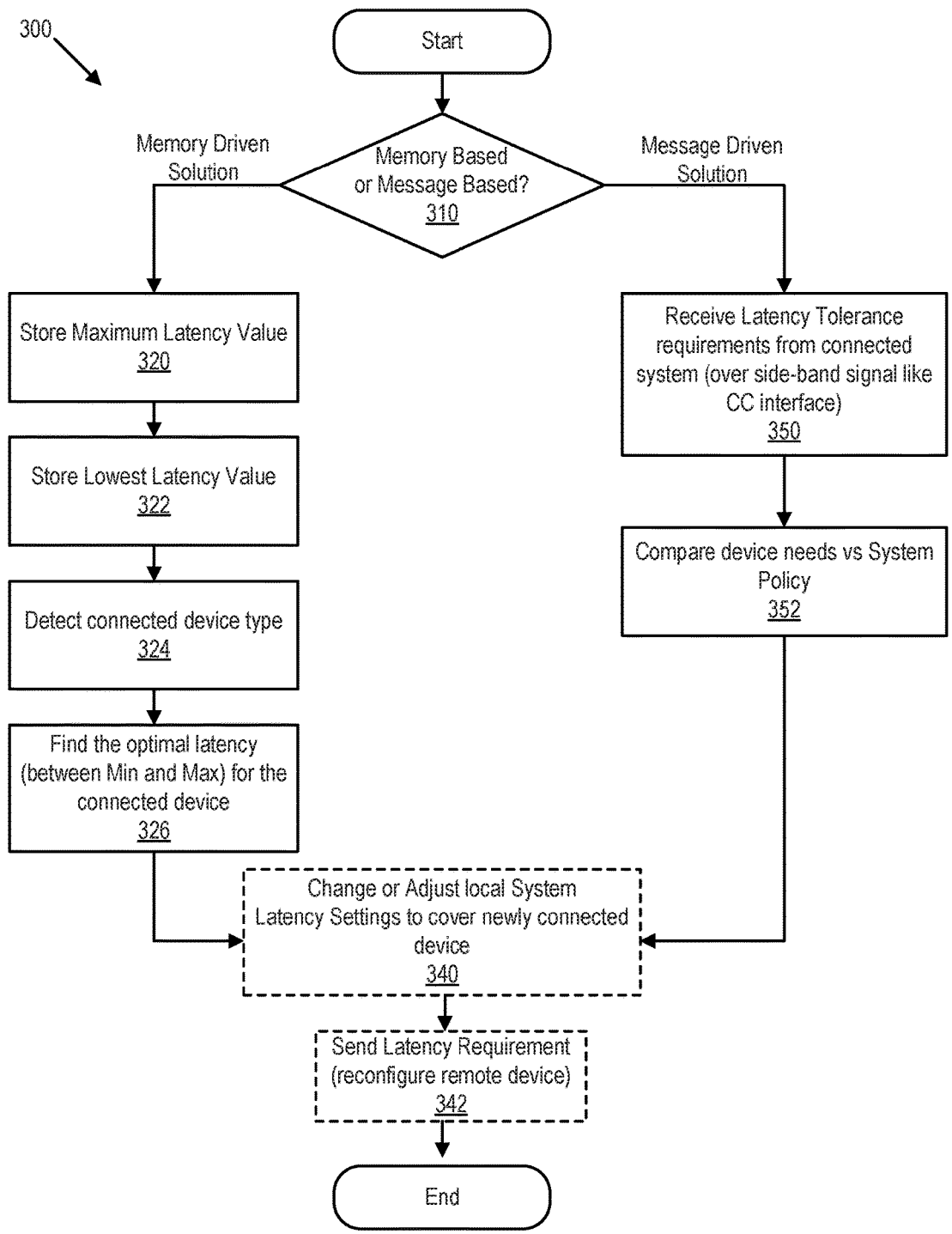
FIG. 3 shows a flow chart of a latency tolerance operation.

Referring to FIG. 3, a flow chart of a latency tolerance operation 300 is shown. More specifically, the operation 300 begins at step 310 by determining whether to perform a memory based latency tolerance operation or a message based latency tolerance operation. In certain embodiments, the memory based latency tolerance operation assumes that connected devices do not provide custom out-of-band notifications (or do not provide latency reporting at all) so the system manager can learn about latency only through detecting device type or standard protocol (e.g., LTR/LTM). With the memory based latency tolerance operation, the system manager detects a connected device type and applies the best latency for a given device from a stored Min/Max latency tolerance range. In certain embodiments, the message based latency tolerance operation assumes that the host and a connected device and/or connected devices can exchange out-of-band messages that clearly identify some or all of the connected devices. The message based latency tolerance operation allows system manager (which in certain embodiments is included within an embedded controller (EC)) to learn about connected device needs and modify system settings (which in certain embodiments are stored within a basic input output system (BIOS)) to enforce or relax certain latency policies. In certain embodiments, modifying the latency tolerance policies balances latency and sleep states while saving power. With the message based latency tolerance operation the system manager will know if the connected device re-configuration is feasible or not and if connected device support in-band latency reporting (LTR/LTM). In certain embodiments, the system manager may attempt to setup remote device latency so latency reported by that device through standard means (LTR/LTM) is optimal (the initial value reported by LTR/LTM is usually very relaxed which may lead to incorrect behavior).

If the latency tolerance module 118 determines that the environment is configured for a memory based tolerance operation, then the latency tolerance operation proceeds to step 320 where a latency tolerance storage location stores a maximum latency tolerance value for the device. Next at step 322, the latency tolerance storage location stores a lowest latency tolerance value from an attached device in the chain of connections. In certain embodiments, the maximum latency tolerance value and the lowest latency tolerance value are stored within respective registers in the port controller. Next, at step 324, the latency tolerance module 118 detects a device type of devices which are connected to the host. Next, at step 326, the latency tolerance module 118 determines an optimal latency for each connected device. In certain embodiments, when a new device is connected to the host, if the host and connected devices support standard latency reporting (LTR/LTM), the latency tolerance operation does not need to adjust system local settings, re-configuration of the remote device will be enough and new reported latency will be taken into account by the host. However, if the newly connected device does not support standard latency reporting then at step 340 the latency tolerance module adjusts the latency settings to take into account the newly connected device and sends the latency settings to the newly connected device at step 342.

In certain embodiments, the port controller comprises a USB Type-C port controller. In certain embodiments, the port controller of a Type-C alternate mode device is designed with the correct latency tolerance value stored in its first register that is needed for the device to function properly. The value in the device register is passed from downstream devices to each Type-C port in a chain of connections back to the host at step 330. The value is entered in the storage location such as by the USB Type-C port controller of the device, by a local embedded controller that recognizes the type of device, or when an alternate mode is requested by a newly connected device. In certain embodiments, when the need for low latency is over, the host changes the latency setting to a higher latency setting thus reducing power draw. In certain embodiments, each link in the chain of connections (i.e., each connected device) adjusts its power management to provide the required latency of the lowest latency tolerant device, especially, the host. In certain embodiments, the port controller in the host forwards the latency tolerance requirements to the host over a general control connection. In certain embodiments, the general control connection includes one or more of an I²C connection, a PCH connection or an embedded controller connection. The memory based tolerance operation than completes.

If the latency tolerance module 118 determines that the environment is configured for a message based tolerance operation, then the latency tolerance operation proceeds to step 350 where the latency tolerance requirements are sent and shared via a side band signal. In certain embodiments, the side band signal does not rely upon a specification defined latency message (e.g. a LTR latency message or a LTM latency message). In certain embodiments, the device latency requirements are provided via a vendor defined message (VDM) which is transmitted via a side band signal path. In certain embodiments, the side band signal path includes a CC signal path. It will be appreciated that if the latency tolerance operation includes sending device latency requirements via a side band signal then the port controllers do not necessarily require latency tolerance storage locations. In certain embodiments, the message based tolerance operation can also include adjusting the latency tolerance requirements depending on whether the device and host are performing latency critical functions at step 352. As with a memory based latency operation, when a new device is connected to the host, if the host and connected devices support standard latency reporting (LTR/LTM), the latency tolerance operation does not need to adjust system local settings, re-configuration of the remote device will be enough and new reported latency will be taken into account by the host. However, if the newly connected device does not support standard latency reporting then at step 340 the latency tolerance module adjusts the latency settings to take into account the newly connected device and sends the latency settings to the newly connected device at step 342. The message based tolerance operation then completes.

Additionally, in certain embodiments, the host sends information downstream only if the latency can be used by standard paths (e.g., LTR, LTM). Otherwise there is not much value for such an operation (exit latency refers to host system operations). With devices making use of vendor defined messages (VDMs) as an alternate reporting path, that latency may be hard-coded into the device. Each device has preconfigured required latency which the host can learn either using a standard method (e.g., via LTR/LTM messages) or out-of-band signaling through VDMs. The host learns about latencies from all connected downstream devices (including a maximum latency and a minimum latency) and configures the system latency accordingly. Based on a type of the connected device, the host can have pre-configured latencies to make the connected device function optimally so that the host would configure a new latency in the connected device (e.g., the host knows it is connected to a particular dock and for that dock to function optimally, the system latency should be higher than 85 us so the host should reconfigure the dock to always report that latency, either using standard LTR/LTM or out-of-band messaging). An optimal function considers that if the latency were lower, the environment might experience mouse and/or keyboard issues, and if the latency were higher, the host won't save power. In certain embodiments for devices that don't include vendor defined messages (e.g., third party devices) and won't necessarily report latency, the host configures a system latency using a pre-defined value for the connected device type.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a latency tolerance operation, comprising:
   determining whether a host and a device coupled to a cable are both capable of communicating information regarding latency tolerance;
   identifying a host latency tolerance and a device latency tolerance;
   configuring the host and the device to communicate based upon the host latency tolerance and the device latency tolerance; and,
   communicating between the host and the device, the communicating conforming to the host latency tolerance and the device latency tolerance; and wherein
   the identifying the host latency tolerance and the device latency tolerance comprises performing at least one of a memory based latency tolerance operation and a message based latency tolerance operation; and,
   the memory based latency tolerance operation comprises storing latency tolerance information within a latency tolerance storage location in a port controller of the device.

2. The method of claim 1, wherein:
   the identifying the host latency tolerance and the device latency tolerance comprises using vendor defined messaging to identify latency tolerance requirements for alternate modes of communication between the host and the device.

3. The method of claim 1, wherein:
   the latency tolerance storage location stores a maximum latency tolerance value for the device and a lowest latency tolerance value from the device.

4. The method of claim 1, wherein:
   the message based latency tolerance operation comprises sending and sharing device latency requirements via an out-of-band band signal other than a specification defined latency message.

5. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   determining whether a host and a device coupled to a cable are both capable of communicating information regarding latency tolerance;
   identifying a host latency tolerance and a device latency tolerance;
   configuring the host and the device to communicate based upon the host latency tolerance and the device latency tolerance; and,
   communicating between the host and the device, the communicating conforming to the host latency tolerance and the device latency tolerance; and wherein
   the identifying the host latency tolerance and the device latency tolerance comprises performing at least one of a memory based latency tolerance operation and a message based latency tolerance operation; and,
   the memory based latency tolerance operation comprises storing latency tolerance information within a latency tolerance storage location in a port controller of the device.

6. The system of claim 5, wherein:
   the identifying the host latency tolerance and the device latency tolerance comprises using vendor defined messaging to identify latency tolerance requirements for alternate modes of communication between the host and the device.

7. The system of claim 5, wherein:
   the latency tolerance storage location stores a maximum latency tolerance value for the device and a lowest latency tolerance value from the device.

8. The system of claim 5, wherein:
   the message based latency tolerance operation comprises sending and sharing device latency requirements via an out-of-band signal other than a specification defined latency message.

* * * * *